Dec. 7, 1948.  A. S. HOWELL  2,455,489
BEARING
Filed Sept. 28, 1944

INVENTOR
ALBERT S. HOWELL
BY Robert F. Miehle Jr.
ATT'Y.

Patented Dec. 7, 1948

2,455,489

UNITED STATES PATENT OFFICE 2,455,489

BEARING

Albert S. Howell, Culver, Ind., assignor to The Bell & Howell Company, Chicago, Ill., a corporation of Illinois Application September 28, 1944, Serial No. 556,175

4 Claims. (Cl. 308—122)

My invention relates to bearings of the rotary type and objects of the invention reside in the provision of a novel, simple and efficient bearing which provides for adequate lubrication thereof, which is economical as to manufacture, which is well adapted to withstand long use, and which is preferably self-alining.

The invention will be better understood by reference to the accompanying drawing, in which—

Figure 1:
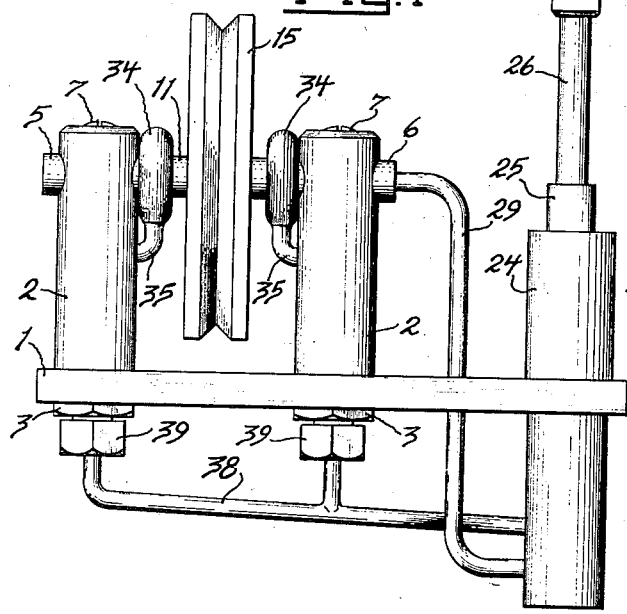
Figure 1 is a side elevational view of a bearing structure embodying my invention.

Referring to the drawing, 1 designates a base, and spaced upright supports 2 are secured on the base by means of headed screw members 3 extending upwardly through the base and screwthreaded into the supports 2. See Figures 1 and 2.

Figure 2:
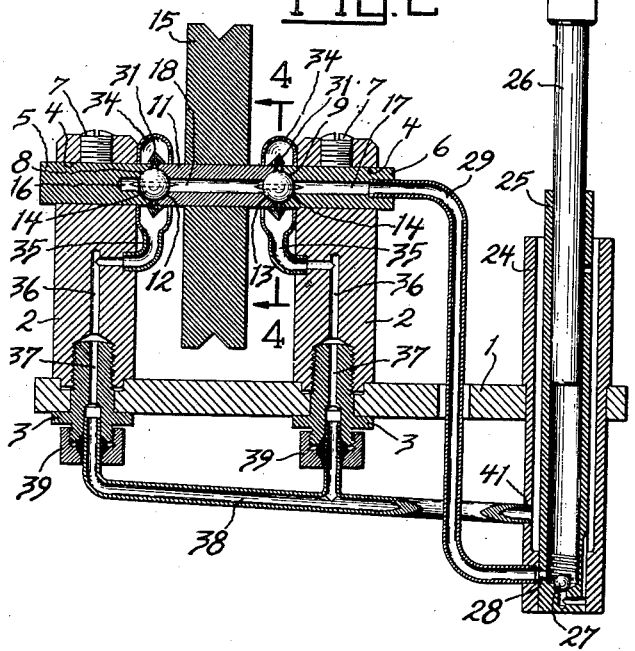
Figure 2 is an axial sectional view of the same.

The upper end portions of the supports 2 are provided with transverse bores 4 which are axially alined, as best shown in Figure 2, and stationary cylindrical support or bearing members 5 and 6 are respectively mounted in these bores and are secured in longitudinally adjusted position therein by means of set screws 7 screwthreaded into the supports 2 and radially engaging these bearing members. As so mounted, these bearing members are disposed in axially alined and spaced relation and constitute support members of the bearing structure.

The opposing ends of the bearing members 5 and 6 are provided with concentric bearing surfaces of concave part spherical character, respectively designated at 8 and 9, which oppose each other axially of the bearing members.

A rotatable shaft 11 extends axially between the bearing members 5 and 6 and its ends are provided with concentric oppositely disposed bearing surfaces of concave part spherical character, respectively designated at 12 and 13, which respectively oppose the bearing surfaces 8 and 9 axially of the rotational axis of the shaft, this axis being coincident with that of the bearing members 5 and 6.

Bearing members 14 of convex spherical character, such as bearing balls, are respectively disposed between and have opposite bearing engagement with opposing of the bearing surfaces 8 and 9 and the bearing surfaces 12 and 13, thus providing a bearing structure upon which the shaft 11 is rotatable, the shaft being thus adapted for carrying any structure, such as a pulley 15, thereon for rotation. See Figures 2 and 3.

The bearing members 5 and 6 and the shaft 11 are axially bored, as designated respectively at 16, 17 and 18, these bores being thus coaxial with the rotational axis of the shaft and constituting lubricant bores. The bore 16 extends only partially through the bearing member 5 and inwardly from the bearing surface 8 thereof and the bores 17 and 18 extend respectively entirely through the bearing member 6 and the shaft 11, so that the bore 17 extends inwardly from the bearing surface 9 and the bore 18 extends inwardly from the bearing surfaces 12 and 13, these bores thus communicating with either or both of the bearing balls 14.

Figure 3:
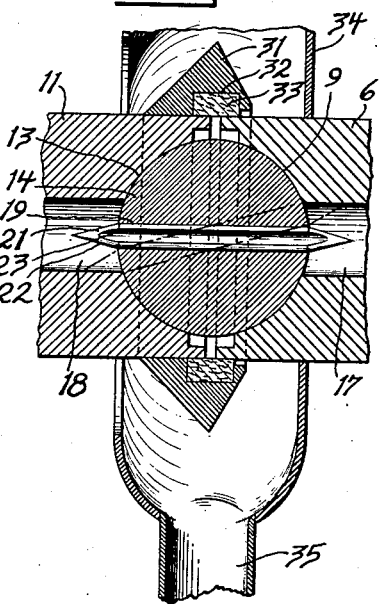
Figure 3 is an enlarged axial sectional view of one of the bearings of the invention.

The bearing balls 14 are provided with lubricant bores 19 extending diametrically therethrough which provide sequential communication with the lubricant bores 16, 17 and 18, and, in order to maintain this communication, limiting pins 21 respectively extend through and are secured by press fitting in the bores 19 of the bearing balls and extend in the bores 16, 17 and 18, and are thus operative to limit angular movement of the bearing balls transversely of the rotational axis of the shaft 11, the pins 21 being of lesser diameter than the bores 16, 17 and 18 and thus being loosely engaged therein to permit a limited amount of angular movement of the bearing balls transversely of the rotational axis of the shaft as indicated in Figure 3. The ends of the limiting pins 21 are preferably tapered, as designated at 22 in Figure 3, to provide an extended contact of the ends of the limiting pins with the walls of the bores 16, 17 and 18 and to permit additional limited angular movement of the bearing balls transversely of the rotational axis of the shaft, it being observed that this angular movement of the bearing balls is limited within a range maintaining communication of the lubricant bores 16, 17, 18 and 19 while providing for self-alinement of the bearing structure. The limiting pins 21 are longitudinally fluted, as designated at 23 in Figures 3 and 4, to provide for the passage of lubricant through the bores 19, so that lubricant fed to the bore 17 of the bearing member 6 passes into all of the lubricant bores and is thus conducted directly to all of the bearing surfaces of the bearing structure with resulting adequate lubrication.

A vertically disposed cylindrical lubricant reservoir 24 is mounted on the base 1, as shown in Figures 1 and 2, and mounted in the reservoir is a vertical pump cylinder 25 provided with a weighted piston 26 as best shown in Figure 2. Communication between the reservoir and the bottom of the pump cylinder is provided by a usual intake check valve 27 permitting passage of lubricant from the reservoir into the pump cylinder as the piston is raised and preventing passage of lubricant from the pump cylinder back to the reservoir. The bottom of the pump cylinder is provided with a restricted outlet 28 which is connected with the outer end of the bore 17 of the bearing member 6 by means of a pipe 29, so that, after the piston 26 is raised to draw lubricant into the pump cylinder 25 and released, the weight of the piston feeds lubricant under pressure into the lubricant bores of the bearing structure and thus adequately lubricates the bearing surfaces of the bearing structure.

Figure 4:
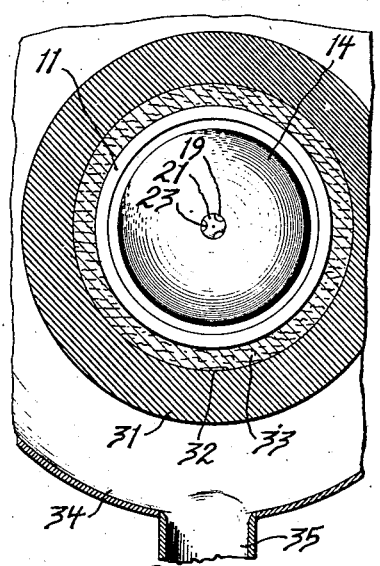
Figure 4 is an enlarged partial sectional view substantially on the line 4—4 of Figure 2.

Annular lubricant sealing devices are provided which surround the bearing members 5 and 6 and the shaft 11 respectively at the axially opposing portions thereof and each of these devices consists, as best shown in Figures 3 and 4, of a rigid annular member 31 in the form of a lubricant throw flange secured on the periphery of the shaft 11 adjacent an end thereof and overhanging the adjacent bearing member 5 or 6 and provided with an internal concentric groove 32 overlapping the adjoining ends of the shaft 11 and the bearing member 5 or 6, and an annular sealing member 33 of yieldable material, such as felt, seated in the groove 32 and bridging the space between the ends of the shaft 11 and the member 5 or 6 and having its inner periphery engaged with the peripheries of the shaft 11 and the bearing member 5 or 6, the sealing member as well as the throw flange 31 rotating about the bearing member 5 or 6 with rotation of the shaft 11.

As lubricant, under pressure from the weight of the piston 26, seeps past the sealing members 33, it is thrown from the throw flanges 31 as the shaft 11 is rotated, and lubricant from the throw flanges is collected by stationary lubricant collecting casings 34 which respectively surround the throw flanges 31. See Figure 2. The lubricant collecting casings are provided with drain outlets 35 which communicate respectively with lubricant passage bores 36 in the upright supports 2 and these bores communicate with lubricant passage bores 37 extending axially through the members 3. A branch pipe 38 has branches thereof respectively secured, by compression couplings 39, with the lower ends of the members 3 in communication with the bores 37, and this pipe communicates with the reservoir 24, as designated at 41, so that lubricant collected by the collecting casings 34 is returned by gravity to the reservoir for re-circulation through the bearing structure by means of the piston 26 operating in the pump cylinder 25 as before described. Thus is provided a lubricant circulating means communicating with the lubricant bore 17 of the bearing member 6 and the drain outlets 35 of the collecting casings 34, whereby constant lubrication of the bearing structure may be afforded with lubricant which is used again and again.

While I have thus described my invention, I do not wish to be limited to the precise details described, as changes may be readily made without departing from the spirit of my invention, but having thus described my invention, I claim as new and desire to secure by Letters Patent the following:

1. In a bearing, the combination of support and rotatable members provided with bearing surfaces of concave part spherical character and opposing axially of the rotational axis of said rotatable member, a bearing member of convex spherical character disposed between and having opposite bearing engagement with said surfaces, said support and rotatable members being provided with lubricant bores coaxial with said rotational axis and said bearing member being provided with a lubricant bore extending diametrically therethrough, and a longitudinally fluted limiting pin extending and secured in said bore of said bearing member and extending into and loosely engaging in said bores of said support and rotatable members and operative to permit limited angular movement of said bearing member transversely of said rotational axis within a range maintaining communication between said lubricant bores.

2. In a bearing, the combination of support and rotatable members provided with bearing surfaces of concave part spherical character and opposing axially of the rotational axis of said rotatable member, a bearing member of convex spherical bearing surface character disposed between and having opposite bearing engagement with said surfaces, limiting means operative on said bearing member to limit angular movement thereof transversely of said rotational axis, said bearing member and at least one of said support and rotatable members being provided with lubricant passages communicating in the region of said rotational axis, an annular lubricant sealing device surrounding said support and rotatable members at the axially opposing portions thereof and secured with said rotatable member for rotation therewith and provided with a peripheral lubricant throw flange, and a stationary lubricant collecting casing surrounding said throw flange and provided with a drain outlet.

3. In a bearing, the combination of support and rotatable members provided with bearing surfaces of concave part spherical character and opposing axially of the rotational axis of said rotatable member, a bearing member of convex spherical character disposed between and having opposite bearing engagement with said surfaces, said support member being provided with a lubricant bore coaxial with said rotational axis and said bearing member being provided with a lubricant bore extending diametrically thereof, a limiting pin extending in both of said bores and adapted to permit the passage of lubricant thereby and loosely engaged in at least one of said bores to permit limited angular movement of said bearing member transversely of said rotational axis within a range maintaining communication of said bores, an annular peripheral lubricant throw flange surrounding said rotatable member in the region of the opposing portions of said support and rotatable members and secured with said rotatable member for rotation therewith, a stationary lubricant collecting casing surrounding said throw flange and provided with a drain outlet, and a lubricant circulating means communicating with the lubricant bore of said support member and said drain outlet and operative to conduct lubricant to said lubricant bore of said support member and to receive lubricant from said drain outlet.

4. In a bearing, the combination of spaced support members and a rotatable member extending axially therebetween and said support members being provided with bearing surfaces of concave part spherical character and opposing axially of the rotational axis of said rotatable member and said rotatable member being provided with oppositely disposed bearing surfaces of concave part spherical character respectively opposing said first mentioned bearing surfaces axially of said rotational axis, bearing members of convex spherical character respectively disposed between and having opposite bearing engagement with opposing of said first and second mentioned bearing surfaces, said rotatable member and at least one of said support members being provided with lubricant bores coaxial with said rotational axis and said bearing members being provided with lubricant bores extending diametrically therethrough and providing sequential communication with said first mentioned bores, longitudinally fluted limiting pins respectively extending and secured in said bores of said bearing members and extending into and loosely engaging in said bores of said support and rotatable members and operative to permit limited angular movement of said bearing members transversely of said rotational axis within a range maintaining communication between said lubricant bores, annular lubricant sealing devices surrounding said support and rotatable members respectively at the axially opposing portions thereof and secured with said rotatable member for rotation therewith and provided with peripheral throw flanges, stationary lubricant collecting casings respectively surrounding said throw flanges and respectively provided with drain outlets, and a lubricant circulating means communicating with the lubricant bore of said one support member and said drain outlets and operative to conduct lubricant to said lubricant bore of said one support member and to receive lubricant from said drain outlets.

ALBERT S. HOWELL.

REFERENCES CITED

The following references are of record in the file of this patent:

UNITED STATES PATENTS

| Number | Name | Date |
|---|---|---|
| 1,003,864 | Avery | Sept. 19, 1911 |
| 1,642,640 | Bouch et al. | Sept. 13, 1927 |